UNITED STATES PATENT OFFICE.

ADOLPH RIEBECK, OF LEIPSIC, SAXONY, GERMAN EMPIRE.

METHOD OF CHARGING GAS-RETORTS WITH HYDROCARBON OILS.

SPECIFICATION forming part of Letters Patent No. 226,001, dated March 30, 1880.

Application filed December 5, 1879. Patented in Germany July 25, 1879, in England October 4, 1879, and in France August 10, 1879.

*To all whom it may concern:*

Be it known that I, ADOLPH RIEBECK, of the city of Leipsic, Saxony, in the German Empire, have invented new and useful Improvements in the Methods of Charging Gas-Retorts with Hydrocarbon or other Volatile Oils, of which the following is a specification, and for which invention I have obtained Letters Patent in the following countries: in Germany under date of July 25, 1879, (No. 8,455;) in England under date of October 4, 1879, (No. 3,994,) and in France under date of August 10, 1879.

My invention relates to a novel process of charging the retorts, whereby any of the volatile oils, more especially the hydrocarbons, are charged together with the coal; and the invention further relates to means employed whereby said volatile oils may be readily handled, together with the coal, as hereinafter more fully described.

Coal, in its various grades has heretofore formed the principal material from which illuminating-gas is manufactured. The large development of the mineral-oil industry, as well as the manufacture of paraffine, has led to the production of materials highly suitable for the manufacture of gas.

It is well known that the admixture of coal-gas with gases generated from mineral oils, and especially from the hydrocarbons, increases its illuminating powers considerably, while such admixture reduces the cost of production.

Many attempts have heretofore been made to attain this result, either by generating these gases in separate retorts, then mixing them, or by means of devices whereby the volatile oil is introduced into the coal-retorts in jets or in spray when said retorts are partly drawn. In either case the illuminating power of the gas is greatly augmented, but the gases produced were small in quantity or volume; and the former method, so far as I am aware, has been entirely abandoned, owing to the fact that it was both costly and complicated, while the latter method had to be abandoned, owing to the danger arising therefrom, and which, so far as I know, has as yet not been averted, and which threatens the destruction of the works at any time by explosion wherever such method is resorted to, as is well understood by those conversant with the highly volatile and inflammable properties of the hydrocarbon oils.

In order to avoid these inconveniences and dangers and enable the gas-manufacturer to employ the hydrocarbon or like volatile oils in the manufacture of gas to increase its illuminating powers and cheapen its production, I charge the volatile oil into the retorts, together with the coal, by employing an absorbent—such, for instance, as coal-dust—a material heretofore wasted, and in the way of the gas-works or the coal-mines, and which is capable of absorbing a large percentage of volatile oil; or else sawdust may be employed, which, in fact, I prefer to use, owing to its great absorbing powers, it being capable of absorbing twice its own weight (more or less) of hydrocarbon oil without letting it drip, and at the same time does not materially increase the ash contents of the retorts, while the dry distillation of said sawdust also contributes to increase the illuminating power of the gas produced.

By means of the absorbent I am also enabled to regulate the quantity of hydrocarbon to be charged with the coal, the gas-producing powers of the latter and the quality of such gas being known or previously ascertained, so as to give to the gas such illuminating power as is most desirable.

The mixing of the hydrocarbon with the absorbent may be effected in any desired manner. One method which I have found practicable is to spread the absorbent out in thin layers and sprinkle the oil upon it either by mechanical means, such as a force-pump the pipe of which carries a rose-head, or by hand with a usual watering-pot provided with a rose-head, or in any other preferred manner.

The charging is also effected, or may be effected, in any usual way, though I have found the following method the best, and employ the usual charging scoop or trough, in which I first spread a layer of coal—say from one-third to one-fourth of the capacity of the charger. The saturated sawdust or coal-dust is then spread over this, and if the former is employed the quantity used is about ten per cent., and if the latter from twenty to twenty-five per cent., of the charge, which is then completed by another layer of coal.

In this manner the saturated absorbent is not immediately subjected to the heat of the retort when the charger is introduced and turned over to discharge its contents and withdrawn in the usual manner, nor can any flashing of the hydrocarbon take place, which, on the contrary, is slowly distilled off with the gas in the coal and, mixed with the latter, escapes to the purifier.

The method of charging is simple, effective, and devoid of all dangers from explosion, while the hydrocarbons so treated are as readily handled as the coal.

I am aware that coal-dust impregnated or saturated with hydrocarbon oil has been described for use in the manufacture of gas, and I do not wish to claim, broadly, the combination of coal in a pulverized state with a volatile oil.

Having now described my invention, what I claim and desire to secure by Letters Patent, is—

In the manufacture of illuminating-gas, the method of charging the retorts with hydrocarbon or volatile oils, which consists in first saturating an absorbent with said oil, as set forth, then interposing a layer of such saturated material between two layers of coal in a suitable scoop or charging-vessel, and introducing the whole into the retort, as specified.

In witness that I claim the foregoing I have hereunto set my hand this 3d day of November, A. D. 1879.

A. RIEBECK.

Witnesses:
 PHILIPP WAGER,
 HENRY VAN ARSDALE.